Figure 6:
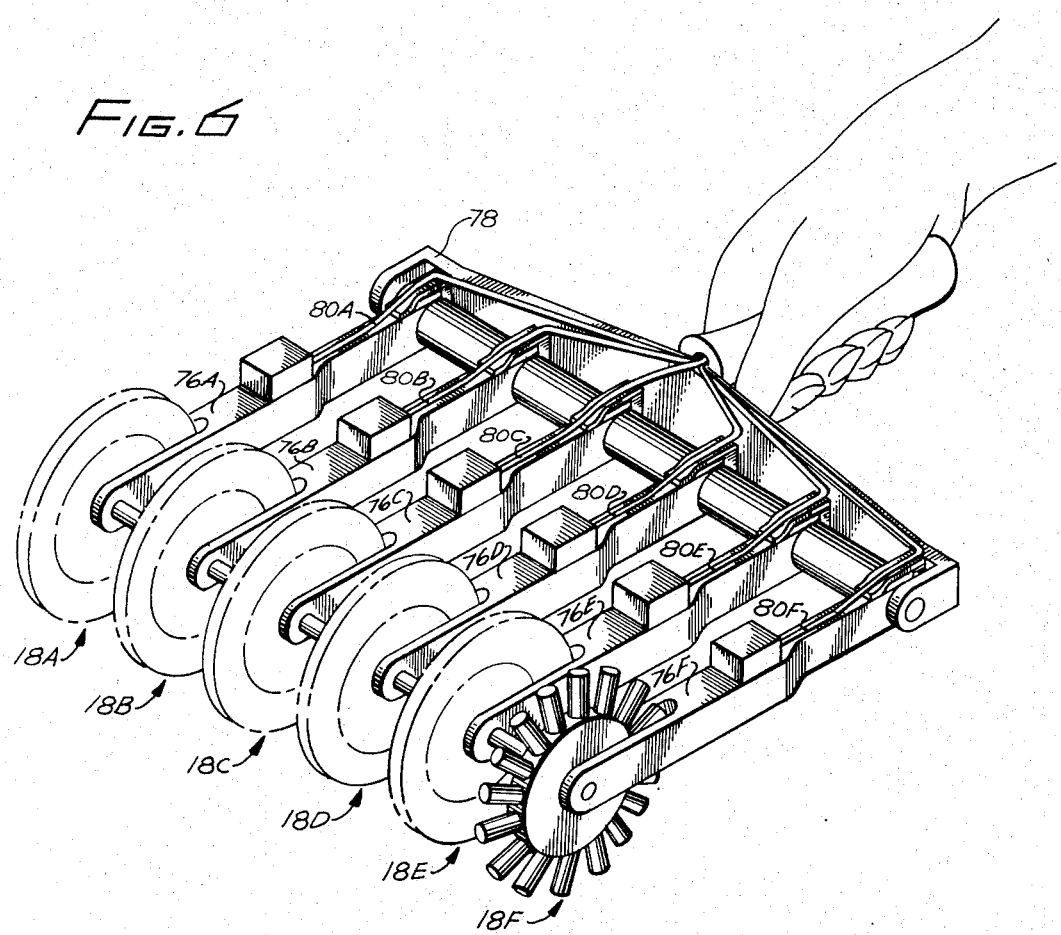

Jan. 2, 1968    D. R. NICHOLS    3,361,225
SONIC TESTING DEVICE
Filed May 31, 1966                                           2 Sheets-Sheet 1
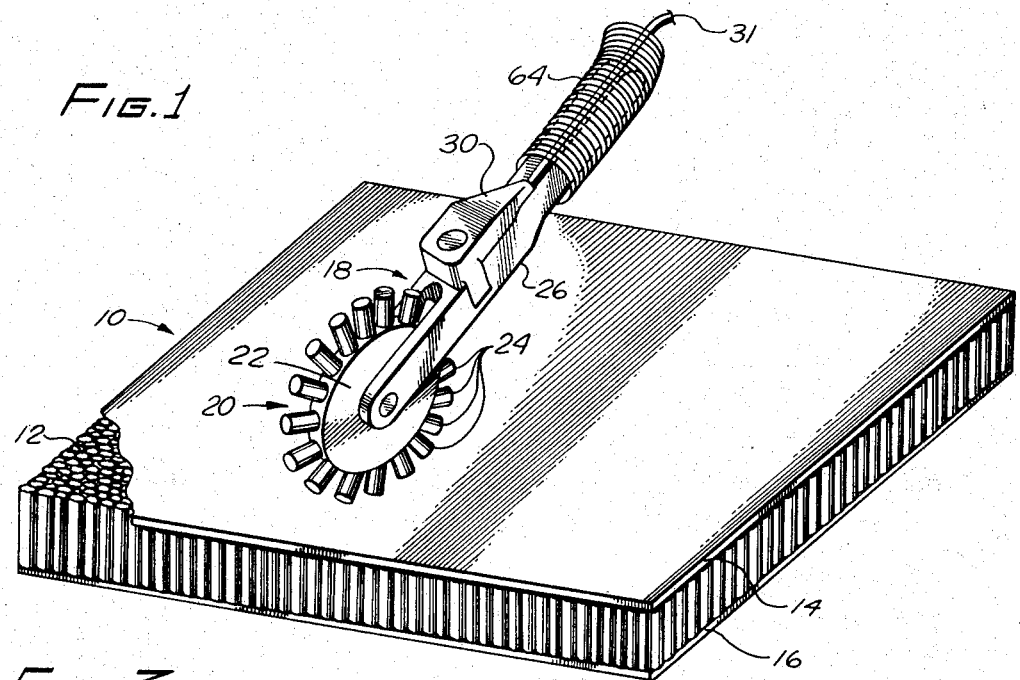
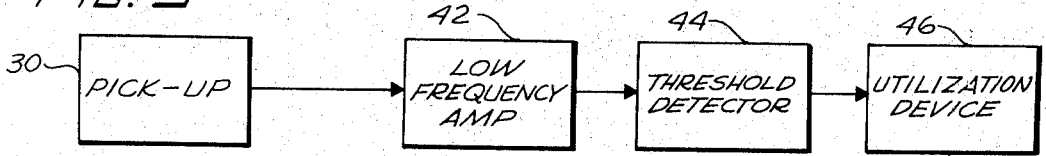
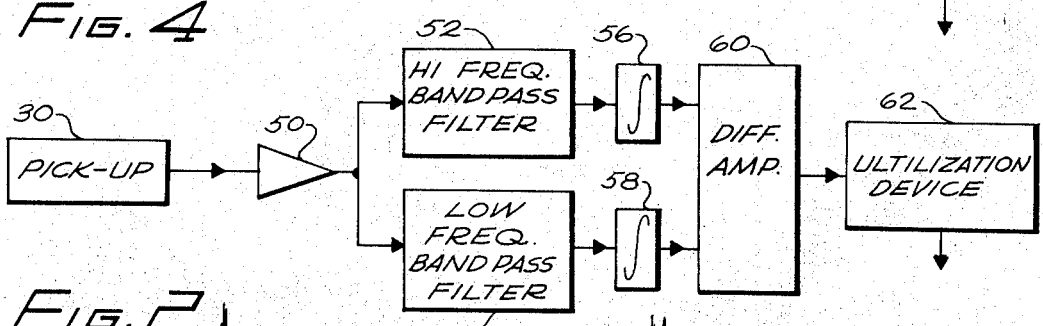
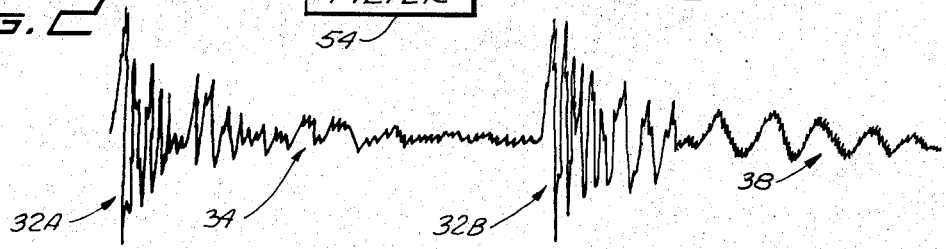
INVENTOR.
DAVID R. NICHOLS
BY
Sidney Magnes Jan. 2, 1968   D. R. NICHOLS   3,361,225
SONIC TESTING DEVICE Filed May 31, 1966   2 Sheets-Sheet 2

INVENTOR.
DAVID R. NICHOLS
BY
Sidney Magnes

United States Patent Office 3,361,225
Patented Jan. 2, 1968

3,361,225
SONIC TESTING DEVICE
David R. Nichols, Palos Verdes Estates, Calif., assignor to North American Aviation, Inc.
Filed May 31, 1966, Ser. No. 554,133
13 Claims. (Cl. 181—.5)

This invention relates to a device for detecting abnormalities in a structure; and more particularly to a device for producing and detecting the passage of audio vibrations through the structure.

Background

One of the most widely used new structural elements is a structure known as a "honeycomb panel." Generally speaking, this panel comprises a three-part sandwich, wherein the central "core" section is formed of strips that are bonded together into a configuration whose cross section is a series of hexagonal formations similar to honeycombs; and the top and bottom portions of the sandwich are sheets or "skins" that are bonded to the upper and lower portions of the honeycomb core. This honeycomb panel has the advantages of being extremely strong and extremely lightweight; and may be formed of various materials—depending upon the weight, strength, and size requirements.

One of the difficulties of fabricating a honeycomb panel is that of securely bonding the upper and lower skins to the central honeycomb core; this bonding being accomplished—depending upon the materials—by adhesives, by brazing, or other techniques. If the core-to-skin bonding is not perfect, the poor bonding produces abnormalities that lower the strength characteristics of the honeycomb panel.

It is, therefore, desirable that each honeycomb panel be thoroughly tested to assure that it is completely bonded into a unitary panel having the desired strength characteristic. Unfortunately, present-day bonding processes are not completely satisfactory; and at various areas of the honeycomb panel the skins are not properly bonded to the honeycomb core. Generally, if these abnormalities or "voids" can be detected, they may be readily repaired before the honeycomb panel is used; but unfortunately, even the best methods for testing the honeycomb have not proved satisfactory.

At present, one of the most widely used methods of testing honeycomb panels is the so-called "ultra-sonic" method. This comprises directing a stream of liquid at the front and at the back skins of the honeycomb, and sending ultra-sonic vibrations through the liquid and through the honeycomb. Suitable transducers are supposed to detect whether the ultra-sonic vibrations are being transmitted satisfactorily through the honeycomb, and to indicate when a void is present. Unfortunately, however, various factors tend to produce erroneous readings; these factors including spurious vibrations, poor electrical and mechanical contact, discrepancies in the pressure and volume of the fluid, etc. Thus, ultra-sonic testing has not been completely satisfactory.

Objects and the drawings

It is therefore an object of the present invention to provide an improved device for testing structural elements such as honeycomb panels.

It is another object of the present invention to provide a test device that uses acoustical vibrations, rather than ultra-sonic vibrations.

It is a further object of the invention to provide a device that will not only detect, but will mark the void areas that are detected.

Figure 5:
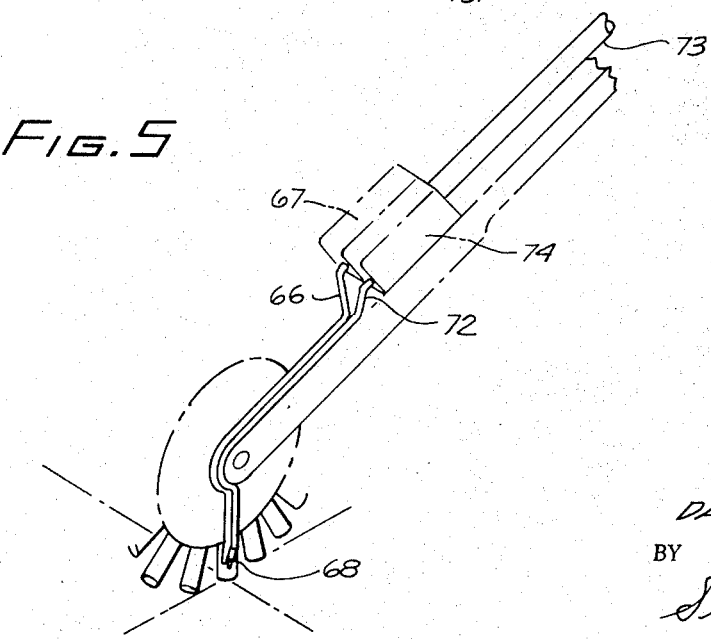

The attainment of these objects and others will be realized from the teachings of the following specification, taken in conjunction with the drawings of which:

FIGURE 1 shows one embodiment of the testing device;
FIGURE 2 shows waveforms associated with the test;
FIGURES 3 and 4 show test circuitry;
FIGURE 5 shows another embodiment of the testing device; and
FIGURE 6 shows a testing device having a plurality of units.

Introduction

It is known that if a honeycomb panel is tapped with a metallic object such as a coin, a well-bonded area of the honeycomb panel will produce a different sound than a poorly-bonded area. In the past, a few people with extremely sensitive hearing have been able to detect the difference in sounds produced by voids in a honeycomb panel. However, this ability tends to be very individualistic, and varies from time to time—depending upon the state of the individual. Therefore, this type of sonic detection has not been very dependable.

Synopsis

Broadly stated, the present application describes a testing device comprising a toothed wheel that is rolled, or "walked," across a surface of the honeycomb panel; each individual tooth of the wheel striking the panel, and producing an audible tapping sound. However, rather than depending upon the human ear to detect any change in sound, a pickup device—such as a microphone—is mounted on the testing device; and the sound is transmitted to the pickup device, which converts the sound to an electrical signal. It has been found that a satisfactory bond produces a different electrical signal than an unsatisfactory bond; and suitable circuitry detects the difference between the different electrical signals—and either displays a signal on a suitable utilization device, or causes suitable circuitry to produce a mark on the honeycomb panel at the point or poor bonding. In this way, the human ear and human judgment is replaced by stable dependable electronic circuitry that both detects and marks the void areas of a poorly bonded honeycomb structure.

Description of the invention

One embodiment of the invention is shown in FIGURE 1. Here a honeycomb panel 10 comprises a core section 12, and upper and lower skin portions 14 and 16 respectively. As previously indicated, it is essential that sections 12, 14, and 16 be securely bonded together. The testing device 18 comprises an externally-toothed wheel 20 that has a disc 22 and a plurality of radially, outwardly-extending teeth 24, or "pegs," that are fixedly mounted on the periphery of disc 22. Wheel 20 is pivotally mounted on a handle 26 by any suitable axle arrangement.

In use, device 18 is "walked" across a surface of honeycomb panel 10. During this walking operation, the individual pegs 24 sequentially strike the surface of the honeycomb panel, each producing an individual audible sound containing a variety of high and low pitched frequencies, which combine to produce a distinctive sound. If, however, the honeycomb panel is not properly bonded at the point of impingement, the normal audio sound is an abnormal sound that comprises a plurality of low-frequency sounds—probably because the unbonded areas tend to vibrate at a lower frequency, and to attenuate the higher frequencies; and it is this change in frequency that it is desired to detect.

As previously indicated, the present invention converts these sounds to an electrical signal, the testing device 18 shown in FIGURE 1 permitting the vibrations occurring within the honeycomb panel to be transmitted upwardly through the peg 24 that is in contact with the panel. It has been found that a Teflon bearing, used between the handle 26 and the axle of disc 22, permits satisfactory transmission of the vibrations. The vibrations move along handle 26 to a sound pickup device, 30, such as a microphone, which thereupon converts the sound to an electrical signal, which is transmitted along a signal cable 31. In order to enhance the operation, disc 22 and pegs 24 are preferably of a low sound-attenuating material, such as metal; and, preferably, the pegs are of uniform diameter, length, and density.

Typical electrical signals that have been obtained with a device of the type described are shown in FIGURE 2. Wave portion 32A shows the type of multi-frequency signals that are produced as an individual peg strikes the honeycomb panel, and wave portion 34 illustrates the type of signal produced from a well-bonded panel. Waveform portion 32B again indicates the tapping sound, and waveform portion 38 indicates the type of signal produced from a poorly bonded panel. As indicated, waveform portion 38 comprises distinguishable large-amplitude, low-frequency signals; probably due to the larger-amplitude lower-vibration rate of the poorly bonded portions. It is obvious from FIGURE 2 that waveform portion 38 tends to be abnormal compared to waveform portion 34; and the abnormal "deviation" of the electrical signal thus indicates an abnormality, or a void area, in the honeycomb panel in the same way an "abnormal" sound indicates a void area to the human ear.

Referring now to FIGURE 3, there is shown an electronic circuit for use with the above device. Here the output from pickup 30 is applied to a low-frequency amplifier 42 that selectively amplifies frequencies characteristic in the waveform portion 38 of FIGURE 2. The output of amplifier 42 is applied to a threshold detector 44, such as a Schmitt trigger circuit, that produces an output signal when the amplitude of waveform portion 38 exceeds a given value. Thus, the combination of the amplifier and the detector distinguish over the output corresponding to waveform portion 34. If the output signal from threshold detector 44 indicates a suitable low-frequency output, this shows that there is an abnormality in the honeycomb panel; and the signal from detector 44 is applied to a utilization device 46. Device 46 may be an oscilloscope that displays the signal; a recorder that provides a permanent record of the quality of the panel; an audio device that signals the operator that the detecting device 18 has just detected a void area in the bonding of the honeycomb panel; or some combination of these devices.

Alternatively, or additionally, utilization device 46 may produce an output signal that is applied to a suitably positioned marking device. Marking nozzles are well known, and use a mechanical plunger or a blast of compressed air to expel a jet of colored powder or liquid that marks the spot at which an individual peg 24 produced a signal that indicated a void. If desired, the marker may comprise a pressurized aerosol dispenser whose valve is actuated by a push-pull cable that operates as described later. In this way, as test device 18 is rolled across panel 10 in any desired pattern, the circuitry of FIGURE 3 produces output signals that indicate the presence of void areas.

It will be understood that in a well-bonded area the electrical signals have a small magnitude in the low-frequency characteristic of waveform portion 38; and will not produce any utilization signals.

It has been found that if the void area is on the front surface of panel 10, the resultant signal from pickup 30 has a waveform that is somewhat different from the waveform produced when the void area is on the back surface of panel 10. If desired, amplifying and filtering circuitry, similar to that described above, may be used to detect the type of output signal, and to identify whether the void is on the front or back surface. A second marking device, producing a differently-colored mark, may be used to indicate which side of the panel has the void.

FIGURE 4 shows another electronic circuit for use with device 18; this circuit being designed for the following situation. As the pickup device 30 ages, there is a possibility that its output signal would drop to such a low magnitude that the circuit would fail to indicate voids. In order to overcome this situation, the circuit of FIGURE 4 passes the output of the pickup device 30 through an amplifier 50, whose output is passed through a high-frequency bandpass filter 52 and a low-frequency bandpass filter 54. In this way, high-frequency filter 52 measures the amount of signal produced by the tapping sound, and low-frequency filter 54 measures the amount of signal produced by a void. The output of these filters are integrated in integrating circuits 56 and 58, whose outputs are then applied to a differential amplifier 60, whose output is in turn applied to a utilization device 62.

If there are no void areas, the high-frequency filter 52 produces a large output signal, and the low-frequency filter 54 produces no output signal; and this unbalance causes differential amplifier 60 to produce an output signal. If there is a void area, the high-frequency filter 54 produces the same large output signal; but the low-frequency filter 54 now produces a large output signal. These two substantially equal output signals are applied to differential amplifier 60, which therefore does not produce an output signal.

The circuitry of FIGURE 4 minimizes aging effects of the microphone as follows. Assume that the microphone has aged to the point of impairing its ability to produce large signals. In the no-void condition, the high-frequency filter 52 now produces a moderate magnitude output signal, and the low-frequency filter does not produce any output signal. As before, this unbalance causes differential amplifier 60 to produce an output signal. If there is a void area, the aged microphone causes the high-frequency filter to again produce a moderate magnitude output signal, and the low-frequency filter also produces a moderate magnitude signal. These two substantially-equal moderate magnitude signals from the filters are applied to differential amplifier 60, which therefore does not produce any output signal. Thus, whether the microphone is new or aged, the differential amplifier distinguishes between the no-void and the void conditions.

It has been found that the output signal from device 18 tends to vary somewhat with the pressure between device 18 and panel 10. To obviate the possibility of the changing pressure producing an erroneous output signal, FIGURE 1 shows device 18 as comprising a resilient handle 64 that assures a substantially uniform pressure between device 18 and the panel, as the device 18 is walked across the surface of the panel and a downward pressure is exerted on the handle.

It has been found that the disclosed device is insensitive to ambient noises, and may be used on flat or curved honeycomb panels.

FIGURE 5 shows another embodiment of the invention; the difference being in the pickup and marking arrangements. This embodiment does not depend upon the vibrations being transmitted back through the pegs to the pickup device. Rather, a pickup tube 66—which may be made of plastic—has its open end positioned adjacent the tapped area; and the sound enters the open end of pickup tube 66, and is transmitted by the tube to pickup device or transducer 67. This pickup device may be extremely small—and this arrangement is used in telephone headset model MS-30-T54, manufactured by the Pacific Plantronics Company of Santa Cruz, Calif.

FIGURE 5 also shows a marking arrangement wherein marker 68 comprises a felt-tipped or nylon-tipped pen, and is positioned adjacent the tapped area; a push-pull cable being attached to the back end of marker 68. The push-pull cable passes through a guide tube 72, and terminates at a solenoid 74. In operation, a signal from the previously described utilization device traverses a wire in conduit 73, and activates solenoid 74, which advances the push-pull cable in guide tube 72; so that the cable movement advances marker 68 to mark the panel. The cable and marker are then retracted by the solenoid, or by a spring.

Under some conditions where extremely large panels are to be tested, it is desirable to "gang" a plurality of test devices, as shown in FIGURE 6. In this case, each device 18A, 18B, etc., has its own individual "handle" 76A, 76B, etc., which is pivotally mounted on a frame 78. Since the separate devices are thus independently mounted, individual resiliency is obtained by means such as springs 80A, 80B, etc., which are attached so as to urge the wheels downwardly relative to the frame 78. An individual microphone is mounted on each device; and it has been found that even though the wheels are in close proximity, there is no cross-talk between their microphones—that is, if one wheel detects a void area, a "void" signal is produced by its microphone, and no void signal is produced by the microphones of its neighboring wheels. For clarity of illustration, the marking arrangement, mounted on each wheel as previously described, has been omitted.

In this way, the ganged test devices of FIGURE 6 may be simultaneously rolled across a flat, curved, or configured panel to be tested; and each device and its associated microphone produces output signals and/or marks that identity when it, and it alone, detects a poorly-bonded abnormality in the honeycomb panel.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. A device for acoustically testing the internal structure of a member, comprising in combination:
    an externally-toothed wheel; and
    means, comprising a hand-held handle and means for pivotally mounting said wheel on said handle, for walking said wheel across the member to be tested, for causing the individual teeth of said wheel to sequentially strike said member, for producing individual sequential acoustical sounds indicative of the internal structure of said member, an abnormal acoustical sound being indicative of an abnormal internal structure.

2. The combination of claim 1 wherein said wheel comprises a disc, and said teeth comprise a single substantially-coplanar set of radially outwardly-extending pegs mounted on the periphery of said disc.

3. The combination of claim 1 wherein said walking means additionally comprises means for maintaining a substantially constant pressure between said wheel and said member.

4. The combination of claim 1 including sound-pick-up means, for converting the acoustical sound into an electrical signal.

5. The combination of claim 1 including sound pick-up means for converting said acoustical sounds into electrical signals, said pickup means being mounted on said handle, and picking up its input signals from vibrations transmitted through said handle.

6. The combination of claim 1 including sound-pick-up means for converting said acoustical sounds into electrical signals, said pickup means comprising a pickup tube having one open end adjacent the area where said acoustical sounds are produced, and having its other end at said sound-pickup means—whereby sounds are conducted through said pickup tube to said pickup means.

7. The combination of claim 4 wherein said disc and said teeth comprise a low acoustical attenuation path between said pickup device and said member under test.

8. The combination of claim 4, including a low frequency amplifier and a threshold detector, for detecting abnormal variations of said electrical signal.

9. The combination of claim 8 including a marking arrangement for marking said member on the occurrence of an abnormal variation of said electrical signal.

10. The combination of claim 9 wherein said marking arrangement comprises pressurized aerosol marking means.

11. The combination of claim 9 wherein said marker is a marking pen.

12. The combination of claim 9 wherein said marker is a marking nozzle.

13. A plurality of devices as defined in claim 4;
    a frame; and
    means for independently and resiliently mounting said plurality of devices on said frame in a ganged manner.

References Cited

UNITED STATES PATENTS

| | | | |
|---|---|---|---|
| 2,725,282 | 11/1955 | Buckley et al. | 73—67 |
| 3,038,329 | 6/1962 | Miller | 73—69 |

FOREIGN PATENTS

| | | |
|---|---|---|
| 482,777 | 7/1953 | Italy. |
| 1,064,730 | 9/1959 | Germany. |

BENJAMIN A. BORCHELT, *Primary Examiner.*

R. M. SKOLNIK, *Assistant Examiner.*